June 27, 1961  E. S. GREINER  2,990,261
PROCESSING OF BORON COMPACT
Filed Dec. 11, 1958

INVENTOR
E.S. GREINER
BY
ATTORNEY

2,990,261
PROCESSING OF BORON COMPACT

Earl S. Greiner, Short Hills, N.J., assignor to Bell Telephone Laboratories, Incorporated, New York, N.Y., a corporation of New York
Filed Dec. 11, 1958, Ser. No. 779,698
5 Claims. (Cl. 23—301)

This invention relates to a floating-zone melting technique, particularly applicable to the processing of boron.

The advent of zone-melting and zone-refining techniques has made possible the production of a multitude of materials in a highly purified, crystalline form. (See U.S. 2,739,088, issued March 20, 1956, to W. G. Pfann.) The zone-melting processes and techniques described in the cited patent involve the use of a crucible or container to hold the material being processed. It has been found necessary to modify the crucible zone-melting process for the refining of a special group of materials including those such as silicon, which are easily contaminated by crucible materials, and also those materials which tend to be highly reactive in their molten state, such as zirconium. Where the melting points and/or chemical properties of materials are such as to result in the aforementioned complication, effort has been made to avoid direct contact between such molten materials and the crucible or container walls. Probably the most generally known of such procedures is that described in copending application Serial No. 326,561, filed December 17, 1952, by H. C. Theuerer. This procedure, known as floating-zone melting, commonly makes use of a vertically disposed ingot and a moving molten zone of such configuration that it is retained in position principally by adhesive forces between the molten and solid phase material being processed and by cohesive forces within the molten zone itself.

The floating-zone procedure has been found applicable to solid charge materials such as are formed by casting processes, as well as to charges consisting of compressed powder compacts. In any event, the charge or body of material to be processed must possess sufficient structural strength at temperatures near its melting point to prevent collapse or disintegration of the body. This requirement presents little problem for those materials which may be cast or easily pressed into suitable shapes. However, for materials which are highly reactive and/or non-plastic, the conventional methods of forming a solid shape are not suitable.

Boron is exemplary of those materials which cannot be molded into a shape by means of conventional techniques. By reason of its extremely reactive nature when in the molten phase, ingots of boron cannot be conveniently prepared by conventional casting processes. The usual techniques of powder metallurgy are not suitable for the formation of a compact of boron because of the absence of plasticity which is required for this type of molding.

Boron is a semiconductive material which is presently under widespread scrutiny for possible use in the fabrication of semiconductor devices. However, such use requires that the material be in a crystalline state, preferably in the form of single crystals. Since the most convenient method presently known for producing such crystalline materials is zone-melting, there is much research being presently conducted in the search for a practical method of zone-refining boron.

In accordance with the present invention, a body of boron is prepared which has sufficient structural strength to permit its refining by the floating-zone technique. The inventive process comprises forming a pressed compact of a mixture of boron particles and boron trioxide ($B_2O_3$). The compact is then heated to cause coalescence of the boron trioxide throughout the compact. Upon cooling, the boron trioxide forms a skeletal structure which imparts a high degree of structural strength to the compact. The boron body, so fabricated, is then zone-refined in the conventional manner.

The invention will be better understood from the following drawings in which.

The drawings have been made not to scale in the interest of clarity of exposition.

Figure 1:
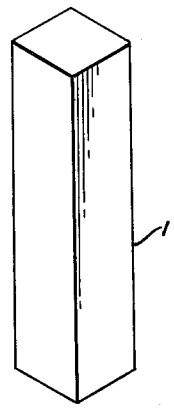
FIG. 1 is a perspective view of a compact produced in accordance with the present invention.

With further references to the drawings, FIG. 1 depicts a compact 1 produced in accordance with the present invention. To produce compact 1, boron trioxide is mixed with boron particles, and the mixture then pressed in a conventional die in accordance with powder metallurgy techniques.

Figure 2:
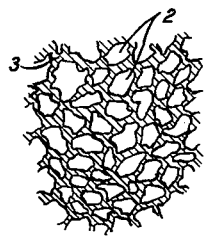
FIG. 2 is a magnified cross-sectional view of a portion of the compact of FIG. 1.

FIG. 2 is a magnified cross-sectional view of a portion of compact 1. Individual boron particles 2 are partially or completely surrounded by boron trioxide 3.

Figure 3:
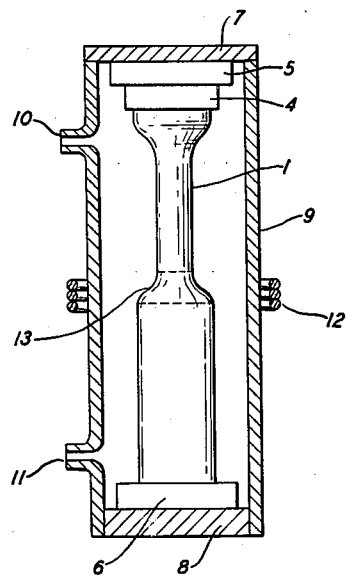
FIG. 3 is a schematic view, partly in section, of a floating-zone apparatus suitable for use in the present invention.

FIG. 3 is a schematic view of a floating-zone apparatus which may be employed to melt compact 1 in accordance with this invention. Shown in FIG. 3 is compact 1 attached at its upper end to a graphite member 4 which is held in place by quartz cup 5. Compact 1 is supported at its lower end by another quartz cup 6. Quartz cups 5 and 6 are attached to supporting members 7 and 8, respectively. Shown in section is quartz envelope 9 with ports 10 and 11 to facilitate the ingress and egress of an inert atmosphere. Also shown in section is coil 12 which is utilized to inductively heat compact 1 thus enabling the formation of molten zone 13. Means not shown permit the movement of envelope 9 through coil 12. The details of construction of floating-zone apparatus are fully described in copending application Serial No. 326,561, mentioned above.

As illustrative of the present invention the formation of a compact using boric acid as the source of boron trioxide is described in detail. Boron particles of high purity are immersed in a boiling aqueous solution of boric acid. The solution is evaporated to dryness while being continually stirred. In this manner, the boron particles are substantially coated with a layer of boric acid ($H_3BO_3$).

It has been determined that optimum results are realized by the use of a quantity of boric acid ($H_3BO_3$) equal to 5 percent by weight of the boron particles. However, quantities of boric acid as low as 3 percent and as high as 7 percent have been found suitable. The use of a quantity of boric acid greater than 7 percent provides no additional advantages and is disadvantageous only in that it represents additional material which must be removed during the purification step. Since removal of the boron trioxide occurs during the zone-refining the use of amounts of this material in quantities larger than that necessary is also undesirable in that it will result in an increased change in the diameter of the body being zone-melted thereby tending to decrease the stability of the molten zone. Use of substantially less than 3 percent by weight does not impart sufficient structural strength to the compact.

The boron particles coated with boric acid are then placed in a conventional die and pressed to form a compact of the desired shape. Since the desired end result is a compact with high structural strength, the highest possible pressures are preferred.

The particle size distribution of the boron is not critical. The considerations determinative of the choice of particle size for pressing compacts are well known, and apply in this instance. (See "Treatise on Powder Metallurgy," C. G. Goetzel, Interscience Publishers, New York (1949–1952).) However, compacts produced from larger particles are slightly advantageous by reason of the reactive ease with which currents are induced therein.

Following the pressing step the compact is treated to dehydrate the boric acid. Removal of water from the boric acid transforms it into boron trioxide. The dehydration may be conveniently accomplished by heating the compact in vacuo. Other conventional methods of dehydration may be used to convert the boric acid to boron trioxide.

The next step in the inventive process consists of heating the compact in vacuo or under an inert atmosphere for a time and at a temperature to assure the melting of the boron trioxide in the compact. During the heating the boron trioxide throughout the compact coalesces into one continuous skeletal mass which solidifies upon cooling and serves as the supporting structure for the boron particles. This heating and cooling cycle imparts substantial structural strength to the compact.

The minimum temperature for the heating step is approximately 580° C., the melting point of boron trioxide. Higher temperatures may be used although no advantage is gained thereby.

The dehydration and melting steps may be combined into one procedure in which the compact is heated in vacuo to dehydrate the boric acid, and the temperature is then raised to melt the boron trioxide so formed.

The compact is now ready to be floating-zone melted. If the compact has longitudinal corners, these corners are preferably removed prior to zone-melting to minimize the "cage" effect which is usually experienced in inductive melting of shapes of non-cylindrical cross-section. The use of a cylindrically-shaped die obviates this grinding step.

To initiate the operation, current is induced in graphite member 4 thus raising its temperature. The portion of compact 1 adjacent graphite member 4 is then heated by conduction. This preliminary step is necessary to reduce the electrical resistivity of the semiconductive boron particles to a point at which a current of sufficient magnitude may be induced to permit the formation of a molten zone.

A molten zone is then passed through the compact, starting at a point below the top of compact 1. As the zone progresses through the compact, boron trioxide is removed thereby resulting in a body of smaller diameter than the original compact. Since the molten zone naturally tends to bulge at the lower portion, stability is enhanced, therefore, by passing the zone through the compact from top to bottom. In this manner, the larger diameter compact will serve to support the correspondingly larger portion of the molten zone.

As the molten zone travels downward through compact 1, the boron trioxide is eliminated in the form of a vapor. In addition, other impurities present are transported to the bottom end of the compact by the molten zone. If the boron trioxide deposits on the walls of the envelope of the zone-melting apparatus thereby preventing observation of the process, it has been found convenient to use an inner envelope concentric with the first, such envelope having a slot running along its length. Continual observation of the process is had by rotation of the inner envelope as the portion of the outer envelope adjacent the slot becomes coated with boron trioxide. (See Journal of Physics and Chemistry of Solids, 1958, vol. 6, pp. 169–172.)

The effect of the zone-length and the zone-progression rate on the shape and impurity content of the charge are well known in the art. (See "Zone Refining" by W. G. Pfann, John Wiley and Sons, Inc., New York, 1958.)

As is well known, the inductive frequency to be used is so chosen as to produce sufficient penetration of the charge while avoiding the violent agitation which may cause the molten zone to become unstable.

The zone-melting is conducted under an atmosphere which is unreactive with the boron or other heated elements within envelope 9. Argon is suitable for such use. However, a small proportion of hydrogen is preferably used with the argon to eliminate the tendency of the argon to ionize.

By judicious choice of parameters, a crystalline body of boron may be prepared in accordance with the above-described method.

The success of this method is due in large measure to the fact that the boron trioxide supporting structure retains its strength at temperatures approaching the melting point of boron, which is approximately 2050° C. The usual binders employed in powder metallurgy processing are not suitable since they would boil off at temperatures far below the melting point of boron. Use of materials with sufficiently high melting and/or boiling points to overcome this disadvantage would necessitate extensive additional processing in order to remove such materials from the charge to be purified. In this respect, the use of boron trioxide is unique in that its presence does not necessitate additional refining.

Examples of this invention are described below:

Example 1

High purity boron particles were immersed in a boiling aqueous solution of boric acid, the total boric acid contained in the solution being approximately 5 percent by weight of the boron particles. The boron particles had a particle size distribution of $-20 +100$ mesh, and were of a purity of approximately 99.7 percent.

The boric acid solution containing the boron particles was evaporated to dryness with constant stirring.

The mixture was placed in a conventional single acting die $\frac{1}{4}$ inch square and 8 inches long. A compact was formed using a pressure of approximately 100,000 pounds per square inch.

The compact was then placed in a silica tube and heated in vacuo at a temperature of approximately 300° C. for a period of approximately 30 minutes. The temperature of the compact was then increased to 600° C. for a period of one-half hour. The compact was then cooled.

The longitudinal corners of the compact were removed by grinding. The compact was then introduced into a zone-melting apparatus similar to that shown in FIG. 3. The volume of the envelope was approximately 12 cubic inches. A radio frequency current at a frequency of 3.5 megacycles was passed through coil 12 to heat the carbon member 4. A molten zone about 300 mils long was then passed through the compact at a rate of approximately 44 mils per minute. During this zone-melting an atmosphere consisting of 1000 cubic centimeters per minute of argon and 10 cubic centimeters per minute of hydrogen was introduced into envelope 9 through port 10.

The resultant zone-refined boron bar was crystalline and was possessed of a resistivity which was too large to permit measurement by thermal probe techniques. Metallographic examination of zone-melted boron disclosed crystals having dimensions of approximately $\frac{1}{10}$ inch.

Example 2

The method of Example 1 was followed except that the particles were in the range $-10 +20$. The zone-refined bar was found to have a crystalline structure.

Although the manner described above for the introduction of boron trioxide into the compact is preferred by reason of its simplicity, other methods are suitable. Thus, for example, particles of boron and boron trioxide may be mixed in a ball mill, and the resultant mixture pressed in the manner described above to form a compact in accordance with this invention. Another alternative is to form a layer of boron trioxide on the crystals of boron by heating them in air.

It is to be understood that the specific example described above is intended merely as illustrative of the present invention. The essence of this invention is considered to be the formation of a compact under pressure which consists of boron and a binder of boron trioxide, either in hydrated or non-hydrated form. Such a compact is exceptionally well suited as a starting material for the floating zone-refining since the binder material imparts structural strength to the compact right up to the time the boron changes from solid to liquid phase. Accordingly, variations may be made in the process described above without departing from the spirit and scope of the present invention.

What is claimed is:

1. Method of producing a crystalline body consisting essentially of boron comprising disposing an elongated body consisting essentially of boron particles in a matrix of boron trioxide in a substantially vertical position, said body being supported solely at its extremities, and producing a moving molten zone extending through the cross section of said elongated body by melting material at one interface and freezing material at the other interface, the said boron trioxide being volatilized in the vicinity of the said molten zone so that the material freezing out of said zone is substantially free of boron trioxide.

2. Method of claim 1 in which said molten zone is caused to travel from the top to the bottom of said elongated body.

3. The method of claim 1 in which said elongated body is fabricated by a process comprising forming a pressed compact consisting essentially of boron and boron trioxide, and heating said compact to melt the boron trioxide.

4. The method of claim 3 in which said elongated body is fabricated by a method comprising mixing boron particles with an aqueous solution of boric acid, drying the mixture, pressing the mixture into a cohesive body, converting the boric acid in said body to boron trioxide by dehydration, and heating said body to melt said boron trioxide.

5. The method of claim 4 in which the quantity of boric acid ($H_3BO_3$) used is in the range of from 3 to 7 percent by weight of the boron particles.

References Cited in the file of this patent

UNITED STATES PATENTS 2,747,971    Hein _____ May 29, 1956
2,789,039    Jensen _____ Apr. 16, 1957

OTHER REFERENCES

Whelan et al.: J. Phys. Chem. of Solids, vol. 6, August 1959, pp. 169–72.

Chem. Abst., vol. 51, Aug. 10, 1957, p. 11128f.